(12) United States Patent
Chen

(10) Patent No.: US 12,468,555 B2
(45) Date of Patent: Nov. 11, 2025

(54) HOST AND METHOD FOR ACCESSING SERVICE MODULE THEREOF

(71) Applicant: Wistron Corp., New Taipei (TW)

(72) Inventor: Feng Yuan Chen, New Taipei (TW)

(73) Assignee: WISTRON CORP., New Taipei (TW)

( * ) Notice: Subject to any disclaimer, the term of this patent is extended or adjusted under 35 U.S.C. 154(b) by 178 days.

(21) Appl. No.: 18/352,653

(22) Filed: Jul. 14, 2023

(65) Prior Publication Data

US 2024/0311162 A1   Sep. 19, 2024

(30) Foreign Application Priority Data

Mar. 15, 2023 (TW) ................. 112109525

(51) Int. Cl.
   *G06F 9/445* (2018.01)

(52) U.S. Cl.
   CPC ................. *G06F 9/44584* (2013.01)

(58) Field of Classification Search
   CPC .... G06F 9/44584; G06F 9/4411; G06F 11/22; G06F 11/3051; G06F 13/10
   See application file for complete search history.

(56) References Cited

U.S. PATENT DOCUMENTS

| | | | |
|---|---|---|---|
| 9,253,249 B2 | 2/2016 | Chen | |
| 2001/0020242 A1* | 9/2001 | Gupta | G06Q 30/02 715/255 |
| 2009/0300640 A1* | 12/2009 | Akitomi | G06F 9/5077 710/100 |
| 2012/0198222 A1* | 8/2012 | Tukol | H04L 61/5061 713/2 |
| 2014/0025726 A1* | 1/2014 | Chen | H04L 67/02 709/203 |
| 2014/0211248 A1* | 7/2014 | Uchikawa | H04L 67/51 358/1.15 |
| 2015/0154858 A1* | 6/2015 | Arling | G06F 16/2455 340/12.28 |

(Continued)

FOREIGN PATENT DOCUMENTS

CN    103268257 B    8/2016

OTHER PUBLICATIONS

Chinese language office action dated Dec. 12, 2023, issued in application No. TW 112109525.

*Primary Examiner* — Hyun Soo Kim

(74) *Attorney, Agent, or Firm* — McClure, Qualey & Rodack, LLP

(57) ABSTRACT

A method for accessing a service is applicable between a host and a device. Service data associated with the service are searched. The service code is sought to determine if it is available or not based on the service data. The service code and the user interface are accessed through a first port number included in the service data if the service code is available. The service code is executed to access the service if the service code is accessed. The status of the device is obtained through the service. The status of the device is displayed on the user interface. The method separates the plug-in program from the main program, which can achieve more flexible development and reduce integration time. When the method puts the user interface on the device side, it can achieve the goal of cross-platform integration and reduce the development time for different platforms.

18 Claims, 7 Drawing Sheets

(56) References Cited

U.S. PATENT DOCUMENTS

| | | | | |
|---|---|---|---|---|
| 2015/0286648 | A1* | 10/2015 | Yoon | H04L 51/42 |
| | | | | 707/711 |
| 2018/0227171 | A1* | 8/2018 | Yoshida | H04L 41/0803 |
| 2022/0012111 | A1* | 1/2022 | Caldato | G06F 9/547 |
| 2024/0036888 | A1* | 2/2024 | Yamada | G06F 9/451 |

* cited by examiner

HOST AND METHOD FOR ACCESSING SERVICE MODULE THEREOF

CROSS REFERENCE TO RELATED APPLICATIONS

This application claims the benefit of Taiwan Application No. 112109525, filed on Mar. 15, 2023, the entirety of which is incorporated by reference herein.

BACKGROUND OF THE DISCLOSURE

Field of the Invention

The present invention relates to a method for accessing a service module, and, in particular, to a method for accessing program service.

Description of the Related Art

Currently, in the process of software development, the main program is developed by respective companies, and the plug-in programs are developed by multiple manufacturers for their own devices. At present, the main program and the plug-in programs are highly dependent on the development framework based on the operating system Windows, because the user interface of a plug-in program also needs to be presented on the main program, and the communication between each component is quite complicated. Moreover, the development of a plug-in program may be put on hold due to the immature development of the main program during the development of new architecture, causing problems in the development schedule.

In addition, because the plug-in program is dependent on the main program during verification, it is difficult to have a standard test method so that each component can be tested independently first, resulting in various problems during the overall integration test. Additional development of the main program requires additional manpower.

BRIEF SUMMARY OF THE DISCLOSURE

An embodiment of the present disclosure provides a method for accessing a service module. The method is applicable between a host and at least one device. The host and the device are electrically connected to each other. The service module includes a user interface and a service code. The method includes the following stages. Service data associated with the service module are searched. The service data includes a first port number for accessing the user interface and the service code. The service code is sought to determine if it is available or not based on the service data. The service code and the user interface are accessed by using the first port number if the service code is available. The service code is executed to access the service module if the service code is accessed, and the status of the device is obtained through the service module. The status of the device is displayed on the user interface.

An embodiment of the present disclosure also provides a host. The host is electrically connected to at least one device. The host includes a memory and a processor. The memory stores a service module. The service module includes a user interface and a service code. The processor executes the following stages. The processor searches for service data associated with the service module. The service data includes a first port number for accessing the user interface and the service code. The processor searches whether the service code is available based on the service data. The processor accesses the service code and the user interface by using the first port number if the service code is available. The processor executes the service code to access the service module if the service code is accessed, and obtains the status of the device through the service module. The processor displays the status of the device on the user interface.

BRIEF DESCRIPTION OF THE DRAWINGS

The disclosure can be more fully understood by reading the subsequent detailed description with references made to the accompanying figures. It should be understood that the figures are not drawn to scale in accordance with standard practice in the industry. In fact, it is allowed to arbitrarily enlarge or reduce the size of components for clear illustration. This means that many special details, relationships and methods are disclosed to provide a complete understanding of the disclosure.

DETAILED DESCRIPTION OF THE DISCLOSURE

Figure 1:
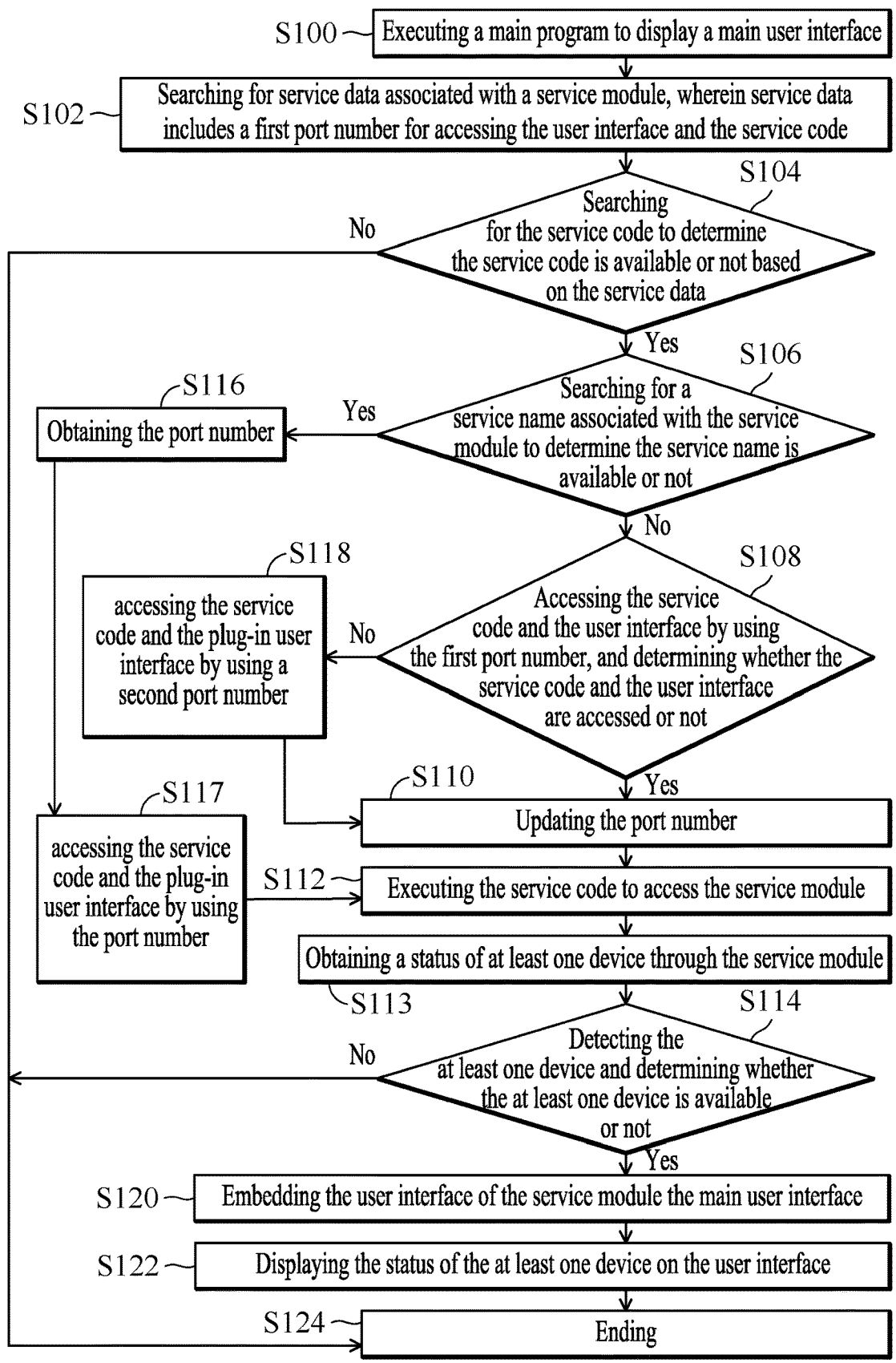
FIG. 1 is a flow chart of a method for accessing a service module in accordance with some embodiments of the present disclosure.

In order to make the above purposes, features, and advantages of some embodiments of the present disclosure more comprehensible, the following is a detailed description in conjunction with the accompanying drawing.

Certain terms are used throughout the description and following claims to refer to particular components. As one skilled in the art will understand, electronic equipment manufacturers may refer to a component by different names. This document does not intend to distinguish between components that differ in name but not function. It is understood that the words "comprise", "have" and "include" are used in an open-ended fashion, and thus should be interpreted to mean "include, but not limited to . . . ". Thus, when the terms "comprise", "have" and/or "include" used in the present disclosure are used to indicate the existence of specific technical features, values, method steps, operations, units and/or components. However, it does not exclude the possibility that more technical features, numerical values, method steps, work processes, units, components, or any combination of the above can be added.

The directional terms used throughout the description and following claims, such as: "on", "up", "above", "down", "below", "front", "rear", "back", "left", "right", etc., are only directions referring to the drawings. Therefore, the directional terms are used for explaining and not used for limiting the present disclosure. Regarding the drawings, the drawings show the general characteristics of methods, structures, and/or materials used in specific embodiments. However, the drawings should not be construed as defining or limiting the scope or properties encompassed by these embodiments. For example, for clarity, the relative size, thickness, and position of each layer, each area, and/or each structure may be reduced or enlarged.

When the corresponding component such as layer or area is referred to as being "on another component", it may be directly on this other component, or other components may exist between them. On the other hand, when the component is referred to as being "directly on another component (or the variant thereof)", there is no component between them. Furthermore, when the corresponding component is referred to as being "on another component", the corresponding component and the other component have a disposition relationship along a top-view/vertical direction, the corresponding component may be below or above the other component, and the disposition relationship along the top-view/vertical direction is determined by the orientation of the device.

It should be understood that when a component or layer is referred to as being "connected to" another component or layer, it can be directly connected to this other component or layer, or intervening components or layers may be present. In contrast, when a component is referred to as being "directly connected to" another component or layer, there are no intervening components or layers present.

The electrical connection or coupling described in this disclosure may refer to direct connection or indirect connection. In the case of direct connection, the endpoints of the components on the two circuits are directly connected or connected to each other by a conductor line segment, while in the case of indirect connection, there are switches, diodes, capacitors, inductors, resistors, other suitable components, or a combination of the above components between the endpoints of the components on the two circuits, but the intermediate component is not limited thereto.

The words "first", "second", "third", "fourth", "fifth", and "sixth" are used to describe components. They are not used to indicate the priority order of or advance relationship, but only to distinguish components with the same name.

It should be noted that the technical features in different embodiments described in the following can be replaced, recombined, or mixed with one another to constitute another embodiment without departing from the spirit of the present disclosure.

FIG. 1 is a flow chart of a method for accessing a service module in accordance with some embodiments of the present disclosure. The method for accessing the service module of the present disclosure is applicable between a host and at least one device. The host and the device are electrically connected to each other. The service module includes a user interface and a service code. As shown in FIG. 1, the method for accessing the service module of the present disclosure includes the following stages. A main program is executed to display a main user interface (step S100). Service data associated with the service module are searched. The service data includes a first port number for accessing the user interface and the service code (step S102). The service code is sought to determine if it is available or not based on the service data (step S104). A service name associated with the service module is sought to determine if it is available or not (step S106). The service code and the user interface are accessed by using the first port number, and it is determined whether the service code and the user interface are accessed or not (step S108). The port number is updated (step S110). The service code is executed to access the service module (step S112). The status of the device is obtained through the service module (step S113). The device is detected and it is determined whether the device is available or not (step S114). The user interface of the service module is embedded within the main user interface (step S120). The status of the device is displayed on the user interface (step S122).

In detail, the main program in step S100 is a program code capable of executing multiple functions, but the present disclosure is not limited thereto. In some embodiments, the main program is usually executed by the processor in the host, but the present disclosure is not limited thereto. In some embodiments, the present disclosure executes the main program to display a main user interface. In some embodiments, the service module in step S100 may, for example, be a service module provided by a plug-in program, but the present disclosure is not limited thereto. In some embodiments, the user interface in step S102 may, for example, be a plug-in user interface, but the present disclosure is not limited thereto. In some embodiments, the service data in step S102 include the first port number for accessing the user interface and the service code. The service data in step S102 further include a communication interface type corresponding to the device, a vendor ID (VID) corresponding to the device, a product ID (PID) corresponding to the device, a storage path of the user interface, a storage path of the service code, a service name of the user interface, and a service name of the service code, but the present disclosure is not limited thereto. In step S104, if the search result indicates that the service code is available, the present disclosure executes step S106 to search whether a service name associated with the service module is available. If the search result indicates that the service code is not available, the present disclosure ends up the process directly (step S124). In some embodiments, step S106 can be omitted. In other words, if the search result is that the service code is available, the present disclosure directly executes step S108, but the present disclosure is not limited thereto. In step S106, if the service name associated to the service module is present, the present disclosure obtains a port number (step S116). In some embodiments, the port number in step S116 may, for example, be a default port number. In some embodiments, the present disclosure accesses the service code and the plug-in user interface by using the port number (step S117), and executes step S112 directly after the access is successful.

In step S106, if the service name associated with the service module is not available, the present disclosure executes step S108, that is, the present disclosure accesses the service code and the plug-in interface by using the first port number in step S102, and determines whether the access is successful. In step S108, if the service code cannot be accessed, that is, the first port number is already occupied, the present disclosure accesses the service code and the plug-in user interface by using a second port number (step S118). Then, the present disclosure executes step S110, that is, the present disclosure updates the port number. For example, when step S108 is "No", the present disclosure sets the second port number as the port number in step S110. When step S108 is "Yes", the present disclosure sets the first port number as the port number in step S110. Other programs and the main program can use the port number for access at the next execution. After that, in step S112, the present disclosure executes the service code to access the service module. Afterwards, in step S113, the present disclosure obtains the status of the device. In step S114, the present disclosure detects whether the device is available or not. In other words, the present disclosure detects whether the device is electrically connected to the host. If the device is detected to be electrically connected to the host, the present disclosure executes step S120. If the device is not detected to be electrically connected to the host, the present disclosure directly ends up the process (step S124).

In some embodiments, each of the first port number in step S108, the second port number in step S118, and the port number in step S116 includes a first sub-port number and a second sub-port number. The first sub-port number is used to access the plug-in user interface of the service module. The second sub-port number is used to access the service code of the service module, but the present disclosure is not limited thereto. In step S120, the present disclosure embeds the plug-in user interface of the service module within the main user interface of the main program. For example, the plug-in user interface can be displayed in a part of the main user interface, but the present disclosure is not limited thereto. In step S122, the present disclosure displays the status of the device obtained in step S112 on the plug-in user interface. After that, the present disclosure ends up the process for accessing the service module (step S124).

Figure 2:
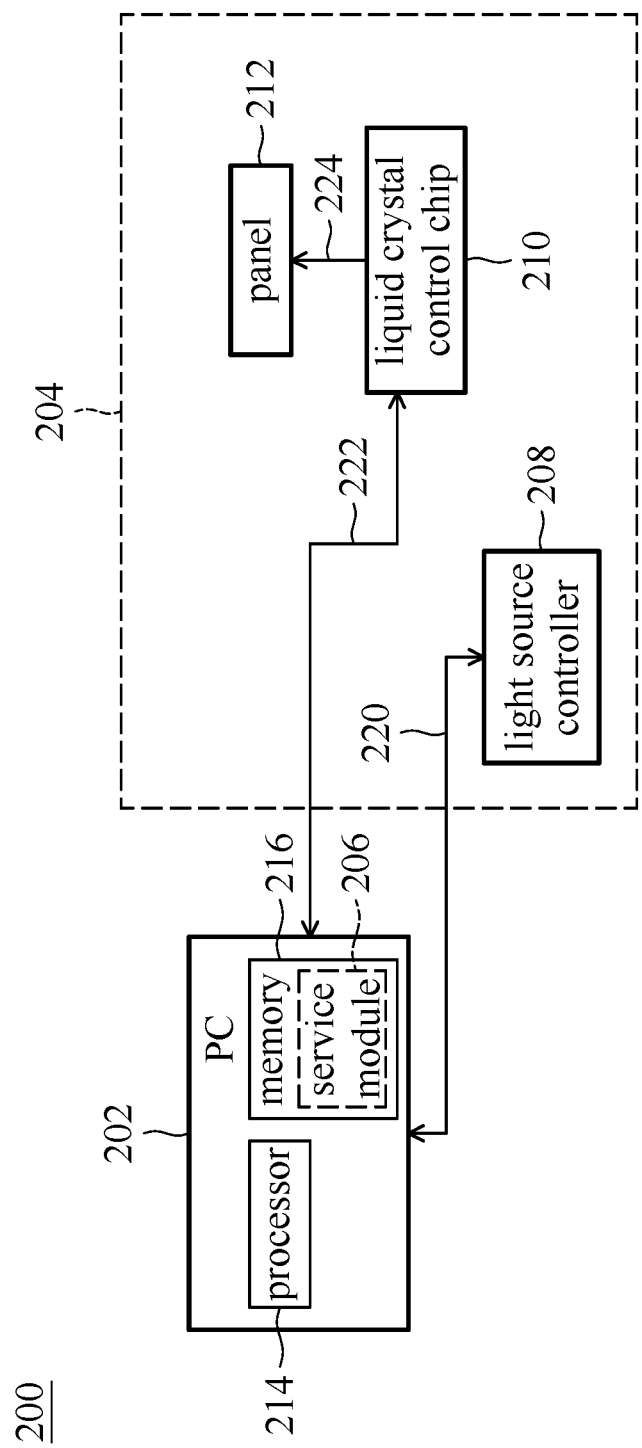
FIG. 2 is a schematic diagram of an electronic device 200 applicable to the method in FIG. 1 in accordance with some embodiments of the present disclosure.

FIG. 2 is a schematic diagram of an electronic device 200 applicable to the method in FIG. 1 in accordance with some embodiments of the present disclosure. As shown in FIG. 2, the electronic device 200 includes a host (PC) 202 and a device 204. The host 202 includes a processor 214 and a memory 216. In some embodiments, the host 202 may, for example, be a personal computer (PC), a workstation server, and a cloud server, but the present disclosure is not limited thereto. In some embodiments, the service module 206 is stored in the host 202. The service module 206 may include a plug-in user interface and a service code. The service module may be, for example, stored in the memory 216 of the host 202, but the present disclosure is not limited thereto. In some embodiments, the device 204 may be, for example, a display. The device 204 includes a light source controller 208, a liquid-crystal control chip 210, and a panel 212. The light source controller 208 communicates with the host 202 through a communication protocol 220. In some embodiments, the communication protocol 220 may, for example, be a universal serial bus (USB), but the present disclosure is not limited thereto. The liquid-crystal control chip 210 communicates with the host 202 through a communication protocol 222. In some embodiments, the communication protocol 222 may, for example, be a display data channel command interface (DDCCI), but the present disclosure is not limited thereto. The liquid-crystal control chip 210 outputs control signals to the panel 212 through a communication protocol 224. In some embodiments, the communication protocol 224 may, for example, be an embedded display port (eDP), but the present disclosure is not limited thereto.

In some embodiments, the processor 214 of the host 202 accesses service module 206 stored in memory 216. The processor 214 of the host 202 first executes a main program to generate a main user interface, and searches for service data associated with the service module 206. In some embodiments, the service module 206 includes a plug-in user interface and a service code. The service data may include, for example, a first port number for accessing the plug-in user interface and the service code. Then, the processor 214 of the host 202 searches whether the service module 206 is available or not based on the service data associated with the service 206. If the service module 206 is determined to be available, the processor 214 of the host 202 continues to search whether a service name associated with the service module 206 is available or not. If the service name associated with the service module 206 is not available, the processor 214 of the host 202 accesses the service code and the plug-in user interface of the service module 206 by using the first port number, and then determines whether the access is successful. If the service code and the plug-in user interface of the service module 206 are accessed, the processor 214 of the host 202 executes the service code of the service 206 and updates the default port number. For example, the processor 214 of the host 202 sets the first port number as the new default port number. After executing the service code of the service module 206, the processor 214 of the host 202 accesses the service module 206 and obtains the status of the device 204 through the service module 206. For example, the processor 214 of the host 202 obtains the status of the light source controller 208 through the communication protocol 220. The processor 214 of the host 202 obtains the status of the liquid-crystal control chip 210 through the communication protocol 222.

Afterwards, the processor 214 of the host 202 detects whether the light source controller 208 and the liquid-crystal control chip 210 are still available. If the above-mentioned devices is available, the processor 214 of the host 202 embeds the plug-in user interface associated with the service module 206 into the main user interface, and displays the status of the device (such as the light source controller 208 and the liquid-crystal control chip 210) on the plug-in user interface associated with the service module 206. In some embodiments, if the service name associated with the service module 206 is available, the processor 214 of the host 202 obtains the default port number and accesses the service code associated with the service module 206 by using the default port number. If the service name associated with the service module 206 is not available and the service code associated with the service module 206 cannot be accessed, the processor 214 of the host 202 accesses the service code and the plug-in user interface associated with the service module 206 by using a second port number, and sets the second port number as the default port number.

Figure 3:
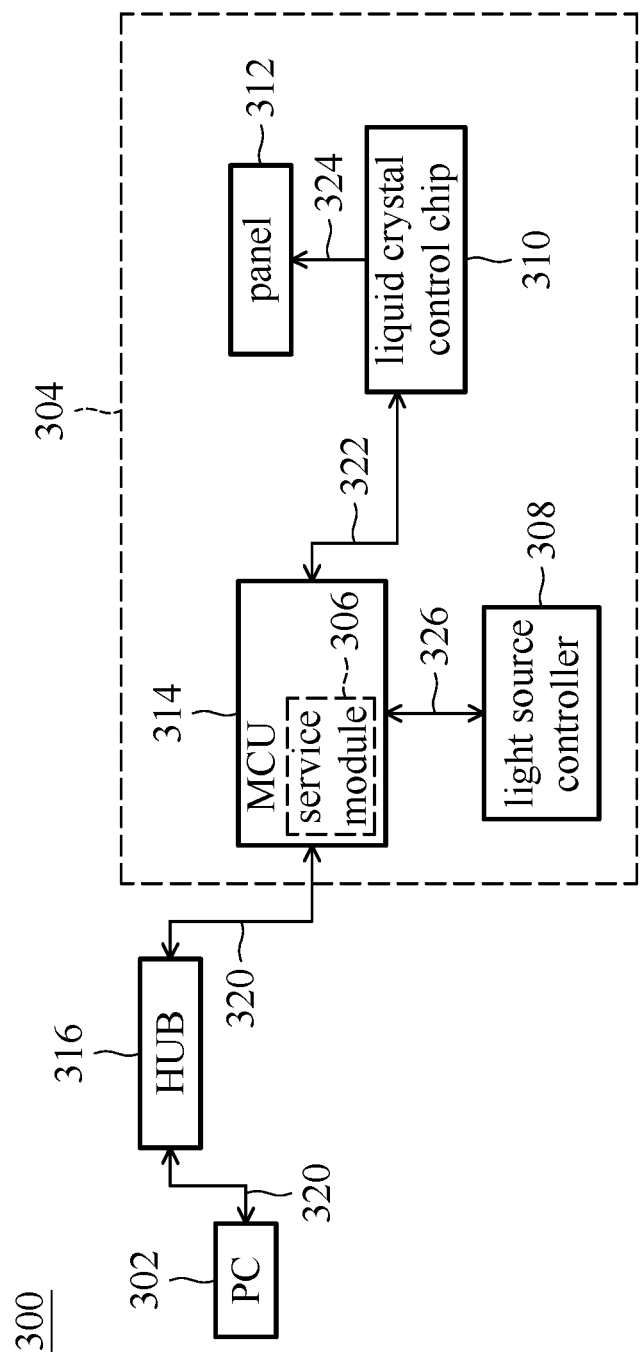
FIG. 3 is a schematic diagram of an electronic device 300 applicable to the method in FIG. 1 in accordance with some embodiments of the present disclosure.

FIG. 3 is a schematic diagram of an electronic device 300 applicable to the method in FIG. 1 in accordance with some embodiments of the present disclosure. As shown in FIG. 3, the electronic device 300 includes a host computer (PC) 302, a router (HUB) 316, and a device 304. In some embodiments, the host 302 may, for example, be a personal computer (PC), a workstation server, and a cloud server, but the present disclosure is not limited thereto. The router 316 is electrically connected between the host 302 and the device 304, and serves as a network intermediary between the host 302 and the device 304. The host 302 communicates with the device 304 through a communication protocol 320. In some embodiments, the communication protocol 320 is the Internet, but the present disclosure is not limited thereto. In some embodiments, the device 304 may be, for example, a display. The device 304 includes a light source controller 308, a liquid-crystal control chip 310, a panel 312, and a microcontroller (MCU) 314. The microcontroller 314 is electrically connected to the router 316 through the communication protocol 320 for communicating with the host 302. The microcontroller 314 communicates with the liquid-crystal control chip 310 through a communication protocol 322, and communicates with the light source controller 308 through a communication protocol 326. In some embodiments, the communication protocol 322 may, for example, be a display data channel command interface (DDCCI), but the present disclosure is not limited thereto. The communication protocol 326 may, for example, be a universal serial bus (USB) or an integrated circuit bus (I2C), but the present disclosure is not limited thereto. The liquid-crystal control chip 310 outputs control signals to the panel 312 through a communication protocol 324. In some embodiments, the communication protocol 324 may, for example, be an embedded display port (eDP), but the disclosure is not limited thereto.

In some embodiments, the service module 306 is stored in the microcontroller 314. The service module 306 includes a plug-in user interface and a service code. The service module 306 may be, for example, stored in a memory (not shown) of the microcontroller 314, but the present disclosure is not limited thereto. The processor of the host 302 first executes a main program to generate a main user interface. The microcontroller 314 searches whether service data associated with the service module 306 is available or not. The service data includes, for example, a first port number for accessing a plug-in user interface and a service code. Next, the microcontroller 314 searches whether the service module 306 is available based on the service data associated with the service module 306. If the service is determined to be available, the microcontroller 314 continues to search whether a service name associated with the service module 306 is available or not. If the service name associated with the service module 306 is not available, the microcontroller 314 accesses the service code and the plug-in user interface of the service module 306 by using the first port number, and then determines whether the access is successful. If the service code and the plug-in user interface of the service module 306 are accessed, the microcontroller 314 executes the service code of the service module 306 and updates the default port number. For example, the microcontroller 314 sets the first port number as the new default port number. After executing the service code of the service module 306, the microcontroller 314 accesses the service module 306 and obtains the status of the device 304 through the service module 306. For example, the microcontroller 314 obtains the status of the light source controller 308 through the communication protocol 326. The microcontroller 314 obtains the status of the liquid-crystal control chip 310 through the communication protocol 322.

Afterwards, the microcontroller 314 detects whether the light source controller 308 and the liquid-crystal control chip 310 are still available. If at least one of the above-mentioned devices is available, the processor of the host 302 embeds the plug-in user interface associated with the service module 306 into the main user interface, and displays the status of the device (such as the light source controller 308 and the liquid-crystal control chip 310) on the plug-in user interface associated with the service module 306. In some embodiments, the processor of the host 302 obtains the plug-in user interface of the service module 306 through the communication protocol 320, and embeds the plug-in user interface associated with the service module 306 into the main user interface. The processor of the host 302 obtains the status of the light source controller 308 and the liquid-crystal control chip 310 through the communication protocol 320, and displays the status of the light source controller 308 and the liquid-crystal control chip 310 on the plug-in user interface associated with the service module 306 in the main user interface. In some embodiments, if the service name associated with the service module 306 is available, the microcontroller 314 obtains the default port number and accesses the service code associated with the service module 306 by using the default port number. If the service name associated with the service module 306 is not available, and the service code associated with service module 306 cannot be accessed, the microcontroller 314 accesses the service code and plug-in user interface associated with the service module 306 by using a second port number, and sets the second port number as the default port number.

Figure 4:
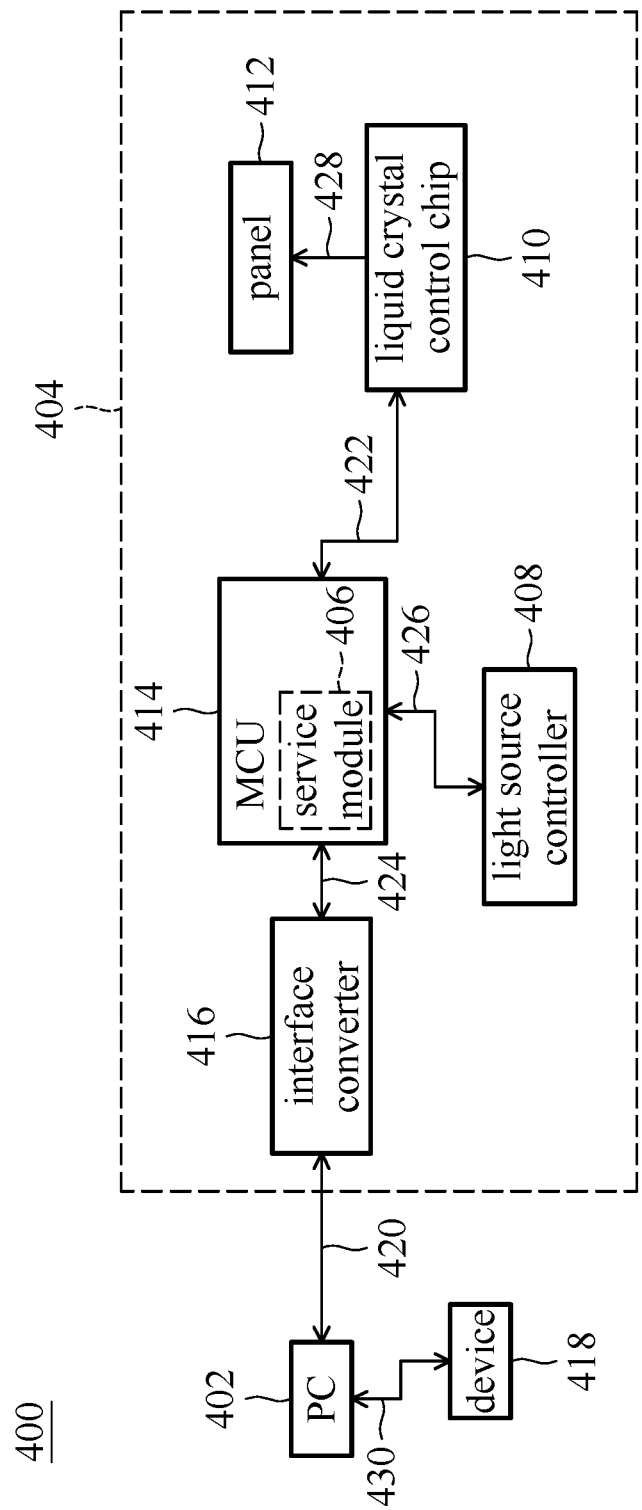
FIG. 4 is a schematic diagram of an electronic device 400 applicable to the method in FIG. 1 in accordance with some embodiments of the present disclosure.

FIG. 4 is a schematic diagram of an electronic device 400 applicable to the method in FIG. 1 in accordance with some embodiments of the present disclosure. As shown in FIG. 4, the electronic device 400 includes a host (PC) 402, a device 404, and a device 418. In some embodiments, the host 402 may, for example, be a personal computer (PC), a workstation server, and a cloud server, but the present disclosure is not limited thereto. The host 402 communicates with the device 404 through a communication protocol 420, and communicates with the device 418 through a communication protocol 430. In some embodiments, the communication protocol 420 and the communication protocol 430 may, for example, be a universal serial bus (USB), but the present disclosure is not limited thereto. In some embodiments, the device 404 may, for example, be a display. The device 404 includes a light source controller 408, a liquid-crystal control chip 410, a panel 412, a microcontroller (MCU) 414, and an interface converter 416. The interface converter 416 converts the communication protocol 420 into a communication protocol 424. In some embodiments, the communication protocol 424 may, for example, be the Internet. The microcontroller 414 communicates with the liquid-crystal control chip 410 through a communication protocol 422, and communicates with the light source controller 408 through a communication protocol 426. In some embodiments, the communication protocol 422 may, for example, be a display data channel command interface (DDCCI), but the present disclosure is not limited thereto. The communication protocol 426 may, for example, be a universal serial bus (USB) or an integrated circuit bus (I2C), but the present disclosure is not limited thereto. The liquid-crystal control chip 410 outputs control signals to the panel 412 through the communication protocol 424. In some embodiments, the communication protocol 424 may, for example, be an embedded display port (eDP), but the present disclosure is not limited thereto.

In some embodiments, a service module 406 is stored in microcontroller 414. The service module 406 includes a plug-in user interface and a service code. The service module 406 may be, for example, stored in a memory (not shown) of the microcontroller 414, but the present disclosure is not limited thereto. The processor of the host 402 first executes a main program to generate a main user interface. The microcontroller 414 searches for service data associated with the service module 406. The service data may include, for example, a first port number for accessing the plug-in user interface and service code. Next, the microcontroller 414 searches whether the service module 406 is available based on the service data associated with the service module 406. If the service module 406 is determined to be available, the microcontroller 414 continues to search for a service name associated with the service module 406. If the service name associated with the service module 406 is not available, the microcontroller 414 accesses the service code and the plug-in user interface of the service module 406 by using the first port number, and then determines whether the access is successful. If the service code and the plug-in user interface of the service module 406 are accessed, the microcontroller 414 executes the service code of the service module 406 and updates the default port number. For example, the microcontroller 414 sets the first port number as the new default port number. After executing the service code of the service module 406, the microcontroller 414 accesses the service module 406 and obtains the status of the device 404 through the service module 406. For example, the microcontroller 414 obtains the status of the light source controller 408 through the communication protocol 426. The microcontroller 414 obtains the status of the liquid-crystal control chip 410 through the communication protocol 422.

Afterwards, the microcontroller 414 detects whether the light source controller 408 and the liquid-crystal control chip 410 are still available. If at least one of the above-mentioned devices is available, the processor of the host 402 embeds the plug-in user interface associated with the service module 406 into the main user interface, and displays the status display of at least one device (such as the light source controller 408 and the liquid-crystal control chip 410) on the plug-in user interface of the service module 406. In some embodiments, the interface converter 416 obtains the plug-in user interface of the service module 406 from the microcontroller 414 through the communication protocol 424, and then forwards the plug-in user interface of the service module 406 to the host 402. The processor of the host 402 obtains the plug-in user interface of the service module 406 through the communication protocol 420 to embed the plug-in user interface associated with the service module 406 into the main user interface. The processor of the host 402 obtains the status of the light source controller 408 and the liquid-crystal control chip 410 through the communication protocol 420, and displays the status of the light source controller 408 and the liquid-crystal control chip 410 on the plug-in user interface associated with the service module 406 in the main user interface. In some embodiments, if a service name associated with service module 406 is available, the microcontroller 414 obtains a default port number and accesses the service code associated with service module 406 by using the default port number. If the service name associated with service module 406 is not available and the service code associated with service module 406 cannot be accessed, the microcontroller 414 accesses the service code and the plug-in user interface associated with the service module 406 by using a second port number, and sets the second port number as the default port number. In some embodiments, even if the device 404 and the device 418 have the same port number in the Internet, the host 402 can also distinguish the device 404 and the device 418 through different USB port numbers for accessing services stored in the device 404 or the device 418.

Figure 5:
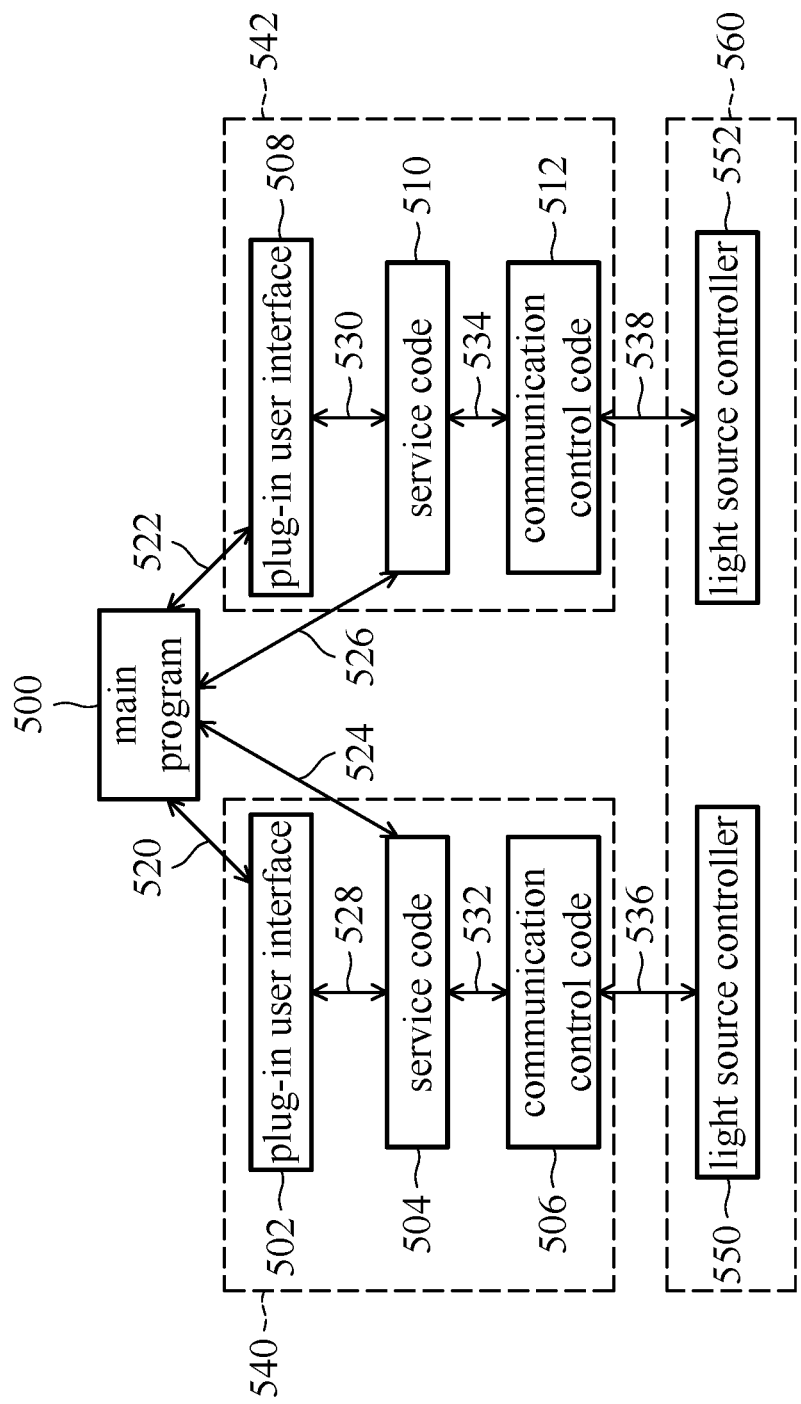
FIG. 5 is a configuration diagram of the main program, the plug-in user interface, and the service code in the method in FIG. 1 in accordance with some embodiments of the present disclosure.

FIG. 5 is a configuration diagram of the main program, the plug-in user interface, and the service code in the method in FIG. 1 in accordance with some embodiments of the present disclosure. As shown in FIG. 5, the main program 500 can use independent subroutines (e.g., subroutine 540 and subroutine 542) to obtain the status of the light source controller 550 and the status of the liquid-crystal controller 552 in the display 560. In detail, the subroutine 540 includes a plug-in user interface 502, a service code 504, and a communication control code 506. The subroutine 542 includes a plug-in user interface 508, a service code 510, and a communication control code 512. The main program 500 and the plug-in user interface 502 communicate with each other through a communication protocol 520. In some embodiments, the communication protocol 520 may, for example, be a Hyper Text Markup Language (HTML). The main program 500 and the plug-in user interface 508 communicate with each other through a communication protocol 522. In some embodiments, the communication protocol 522 may, for example, be a Hyper Text Markup Language (HTML). In other words, each of the plug-in user interface 502 and the plug-in user interface 508 can be a web page, but the present disclosure is not limited thereto. The main program 500 and the service code 504 communicate with each other through a communication protocol 524. In some embodiments, the communication protocol 524 may, for example, be an Open Application Programming Interface Specification (Open API). The main program 500 and the service code 510 communicate with each other through a communication protocol 526. In some embodiments, the communication protocol 524 may, for example, be an Open Application Program Interface Specification (Open API).

The plug-in user interface 502 and the service code 504 communicate with each other through a communication protocol 528. In some embodiments, the communication protocol 528 may, for example, be an Open API. Similarly, the plug-in user interface 508 and the service code 510 communicate with each other through a communication protocol 530. In some embodiments, the communication protocol 530 may, for example, be an Open API. The service code 504 and the communication control code 506 communicate with each other through a communication protocol 532. In some embodiments, the communication protocol 532 may, for example, be an Open API or a function call. Similarly, the service code 510 and the communication control code 512 communicate with each other through a communication protocol 534. In some embodiments, the communication protocol 534 may, for example, be an Open API or a function call. In some embodiments, the communication control code 506 is used to control an application programming interface (API) of the light source controller 550. The communication control code 512 is an application programming interface (API) for controlling the liquid-crystal control chip 552. The communication control code 506 controls the light source controller 550 through a communication protocol 536. In some embodiments, the communication protocol 536 may, for example, be universal serial bus (USB). The communication control code 512 controls the liquid-crystal control chip 552 through a communication protocol 538. In some embodiments, the communication protocol 538 may, for example, be display data channel command interface (DDCCI).

Figure 6:
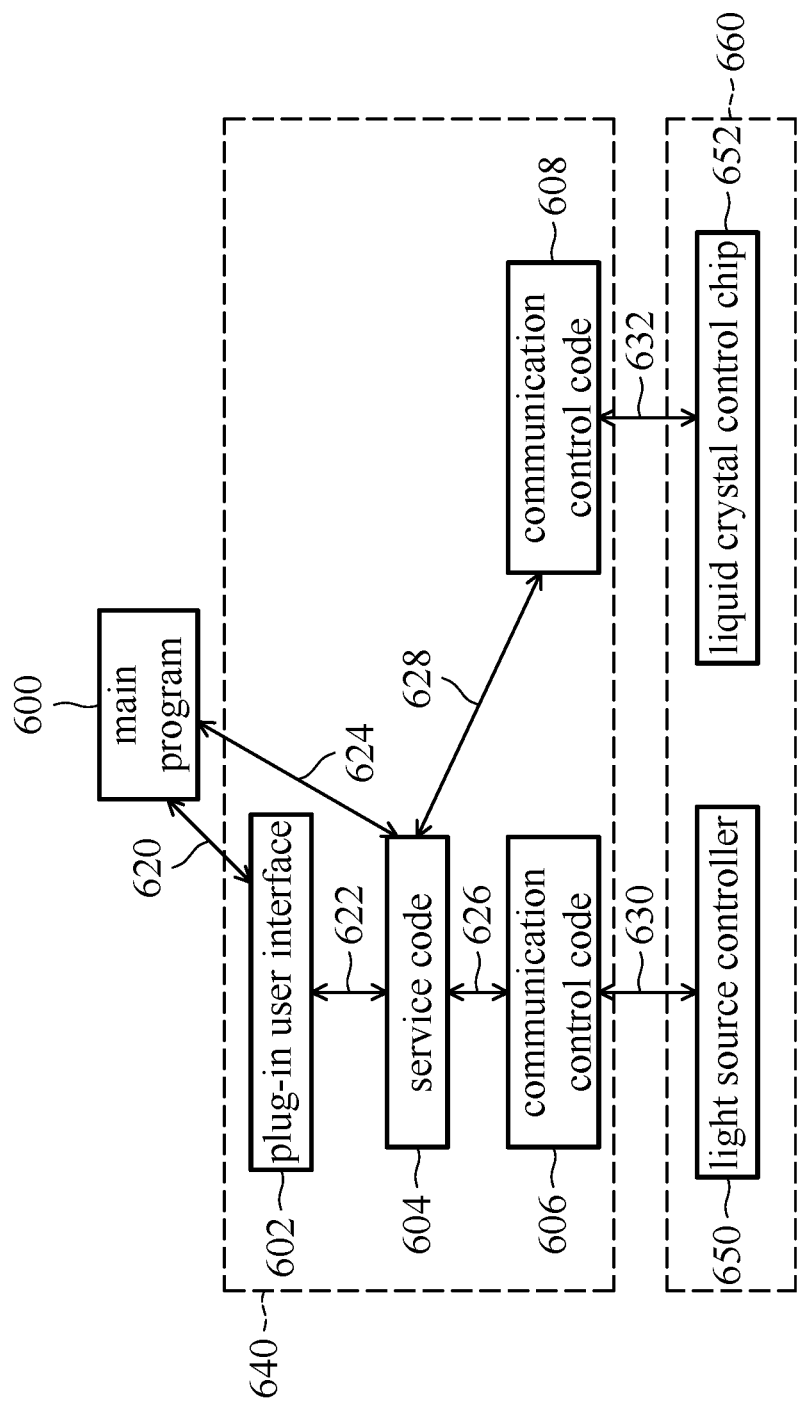
FIG. 6 is a configuration diagram of the main program, the plug-in user interface, and the service code in the method in FIG. 1 in accordance with some embodiments of the present disclosure.

FIG. 6 is a configuration diagram of the main program, the plug-in user interface, and the service code in the method in FIG. 1 in accordance with some embodiments of the present disclosure. As shown in FIG. 6, the main program 600 can use a single subroutine (e.g., subroutine 640) to obtain the status of the light source controller 650 and the status of the liquid-crystal controller 652 in the display 660. In detail, the subroutine 640 includes a plug-in user interface 602, a service code 604, a communication control code 606, and a communication control code 608. Compared with the embodiment in FIG. 5, the embodiment in FIG. 6 reduces the number of services, for example, from 2 services to 1 service. The main program 600 and the plug-in user interface 602 communicate with each other through a communication protocol 620. In some embodiments, the communication protocol 620 may, for example, be a Hyper Text Markup Language (HTML). In other words, the plug-in user interface 602 can be a webpage, but the present disclosure is not limited thereto. The main program 600 and the service code 604 communicate with each other through a communication protocol 624. In some embodiments, the communication protocol 624 may, for example, be an Open API.

The plug-in user interface 602 and the service code 604 communicate with each other through a communication protocol 622. In some embodiments, the communication protocol 622 may, for example, be an Open API. The service code 604 and the communication control code 606 communicate with each other through a communication protocol 626. In some embodiments, the communication protocol 626 may, for example, be an Open API or a function call. Similarly, the service code 604 and the communication control code 608 communicate with each other through a communication protocol 628. In some embodiments, the communication protocol 628 may, for example, be an Open API or a function call. In some embodiments, the communication control code 606 is used to control the API of the light source controller 650. The communication control code 608 is an API for controlling the liquid-crystal control chip 652. The communication control code 606 controls the light source controller 650 through a communication protocol 630. In some embodiments, the communication protocol 630 may, for example, be a USB. The communication control code 608 controls the liquid-crystal control chip 652 through a communication protocol 632. In some embodiments, the communication protocol 632 may, for example, be a DDCCI.

Figure 7:
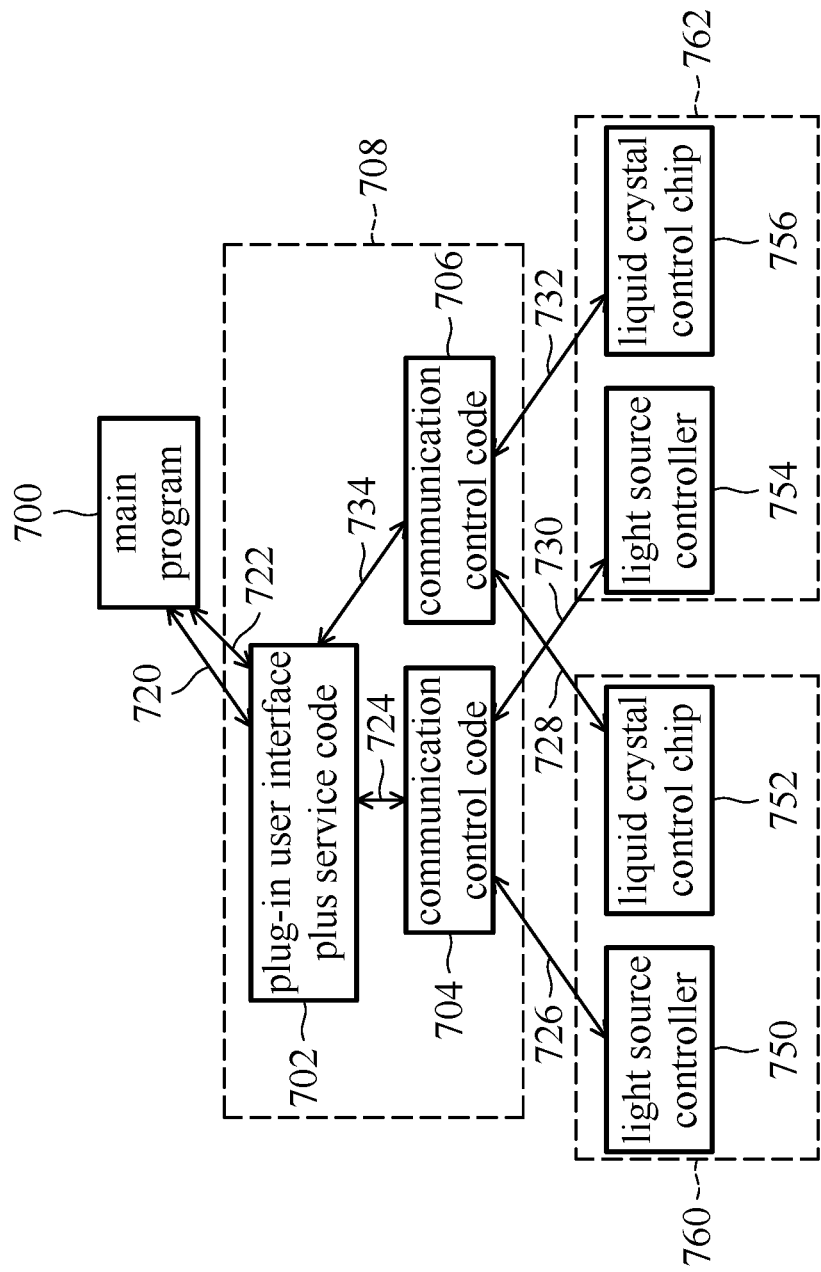
FIG. 7 is a configuration diagram of the main program, the plug-in user interface, and the service code in the method in FIG. 1 in accordance with some embodiments of the present disclosure.

FIG. 7 is a configuration diagram of the main program, the plug-in user interface, and the service code in the method in FIG. 1 in accordance with some embodiments of the present disclosure. As shown in FIG. 7, the main program 700 can use a single subroutine (for example, subroutine 708) to obtain the status of the light source controller 750 and the status of the liquid-crystal controller 752 in the display 760, and obtain the status of the light source controller 754 and the status of the liquid-crystal controller 756 in the display 762. In detail, the subroutine 708 includes a plug-in user interface plus service code 702, a communication control code 704, and a communication control code 706. In some embodiments, the plug-in user interface plus service code 702 is to integrate the plug-in user interface and the service code of the service. The main program 700 and the plug-in user interface plus service code 702 communicate with each other through a communication protocol 720 and a communication protocol 722. In detail, the main program 700 accesses the plug-in user interface in the plug-in user interface plus service code 702 through the communication protocol 720. On the other hand, the main program 700 accesses the service code in the plug-in user interface plus service code 702 through the communication protocol 722. In some embodiments, the communication protocol 720 may, for example, be an HTML. In other words, the plug-in user interface in the plug-in user interface plus service code 702 can be a webpage, but the present disclosure is not limited thereto. In some embodiments, the communication protocol 722 may, for example, be an Open API.

The plug-in user interface plus service code 702 and communication control code 704 communicate with each other through a communication protocol 724. In some embodiments, the communication protocol 724 may, for example, be an Open API or a function call. Similarly, the plug-in user interface plus service code 702 and the communication control code 706 communicate with each other through a communication protocol 734. In some embodiments, the communication protocol 734 may, for example, be an Open API or a function call. In some embodiments, the communication control code 704 is an API for controlling the light source controller 750 and the light source controller 754. The communication control code 706 is an API for controlling the liquid-crystal control chip 752 and the liquid-crystal control chip 756. The communication control code 704 controls the light source controller 750 through a communication protocol 726. The communication control code 704 controls the light source controller 754 through a communication protocol 730. In some embodiments, the communication protocol 726 and the communication protocol 730 may, for example, be a USB. The communication control code 706 controls the liquid-crystal control chip 752 through a communication protocol 728. The communication control code 706 controls the liquid-crystal control chip 756 through a communication protocol 732. In some embodiments, the communication protocol 728 and the communication protocol 732 may, for example, be a DDCCI.

Table 1 is a schematic table of service data associated with the service.

TABLE 1

| Device | DQ241H | DA232H |
|---|---|---|
| Communication Interface Type | USB | DDCCI |
| PID | 0x1234 | 0x4321 |
| VID | 0xABCD | 0xDCBA |
| Storage path of the service code | C:\dev\pluginA.service | C:\dev\pluginB.service |
| Storage path of the plug-in user interface | C:\dev\pluginA_UI.service | C:\dev\pluginB_UI.service |
| Service name of the service code | DQ241HSrv | DA232HSrv |
| Service name of the plug-in user interface | DQ241HUISrv | DA232HUISrv |
| Port number of the service code | 7000 | 6000 |
| Port number of the plug-in user interface | 7001 | 6001 |

As shown in Table 1, the method for accessing the service in FIG. 1 of the present disclosure searches for 2 services in 2 devices. The embodiment in Table 1 is applied to the electronic device 200 in FIG. 2. That is, the service is stored in the host side. For the device DQ241H, the communication interface is USB, the PID is 0x1234, the VID is 0xABCD, the storage path of the service code is C:\dev\pluginA.service, the storage path of the plug-in user interface is C:\dev\pluginA_UI.service, the service name of the service code is DQ241HSrv, the service name of the plug-in user interface is DQ241HUISrv, the port number of the service code is 7000, and the port number of the plug-in user interface is 7001. On the other hand, for the device DA232H, the communication interface is DDCCI, the PID is 0x4321, the VID is 0xDCBA, the storage path of the service code is C:\dev\pluginB.service, the storage path of the plug-in user interface is C:\dev\pluginB_UI.service, the service name of the service code is DA232HSrv, the service name of the plug-in user interface is DA232HUISrv, the port number of the service code is 6000, and the port number of the plug-in user interface is 6001.

In some embodiments, if the services are stored in the device DQ241H and the device DA232H respectively, the storage path of the service code of the device DQ241H may be changed to http://dev/pluginA.service, and the storage path of the plug-in user interface of the device DQ241H will be changed to http://dev/pluginA_UI.service. Similarly, the storage path of the service code of the device DA232H may be changed to http://dev/pluginB.service, and the storage path of the plug-in user interface of the device DA232H will be changed to http://dev/pluginB_UI.service.

The method disclosed in the present disclosure separates the plug-in program from the main program, which can achieve more flexible development and reduce integration time. When the method disclosed in the present disclosure puts the plug-in user interface on the device side, it can achieve the goal of cross-platform integration and reduce the development time for different platforms. The service (or plug-in program) in the disclosed method has independent functions and scalability, which can save the development time and cost of the plug-in program, save a development team's debugging and integration development time, reduce development time during cross-platform development, and have remote management functions. The plug-in user interface and device control in the disclosed method can be integrated together, and the same components can be used regardless of the main program modification structure, as long as the access method is to use open data, such as an HTML, and an open API.

In the disclosed method, the plug-in user interface and the control of the bottom layer device can be completely independent, and the modification of the plug-in user interface and the control of the bottom layer device can be completely independent. The plug-in program in the disclosed method can also be provided as an independent program for third-party program access without additional development. In addition to access the main program, the plug-in program itself in this disclosed method can also provide additional functions, and only the main program can be used without binding. For example, if the user has 2-3 main programs with different functions, but their purpose is to control the functions of the device, the plug-in program disclosed in this present disclosure can solve the trouble of additional integration of each main program.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for accessing a service module, applicable between a host and at least one device, wherein the host and the at least one device are electrically connected to each other, and the service module comprises a user interface and a service code, the method comprising:
searching for service data associated with the service module; wherein the service data comprises a first port number for accessing the user interface and the service code;
searching whether the service code is available based on the service data;
accessing the service code and the user interface by using the first port number if the service code is available;
executing the service code to access to the service module if the service code is accessed, and obtaining a status of the at least one device through the service module;
displaying the status of the at least one device on the user interface;
searching whether a service name associated with the service module is available if the service code is available;
obtaining a port number if the service name associated with the service module is available; and
accessing the service code by using the port number.

2. The method as claimed in claim 1, further comprising: updating the port number if the service code is accessed.

3. The method as claimed in claim 2, further comprising:
executing a main program to display a main user interface before searching for the service data;
accessing the service code and the user interface by using a second port number if the service name associated with the service module is not available and the service code cannot be accessed;
detecting whether the at least one device is available after obtaining the status of the at least one device through the service module; and
embedding the user interface of the service module within the main user interface if the at least one device is available.

4. The method as claimed in claim 1, further comprising:
accessing the service code and the user interface by using a second port number if the service name associated with the service module is not available or the service code cannot be accessed.

5. The method as claimed in claim 1, further comprising:
detecting whether at least one device is available after obtaining the status of the at least one device through the service module.

6. The method as claimed in claim 1, wherein the user interface is a plug-in user interface.

7. The method as claimed in claim 1, wherein the user interface and the service code are stored in the host or the at least one device.

8. The method as claimed in claim 1, wherein the user interface is a web page.

9. The method as claimed in claim 1, wherein the service data further comprise the following:
a communication interface type corresponding to the at least one device, a vendor ID corresponding to the at least one device, a product ID corresponding to the at least one device, a storage path of the user interface, a storage path of the service code, a first service name of the user interface, and a second service name of the service code.

10. The method as claimed in claim 1, wherein the first port number comprises a first sub-port number and a second sub-port number; the first sub-port number is used to access the user interface, and the second sub-port number is used to access the service code.

11. The method as claimed in claim 1, further comprising:
executing a main program to display a main user interface before searching for the service data; and
embedding the user interface of the service module within the main user interface.

12. The method as claimed in claim 11, wherein the main program and the user interface communicate with each other through a Hyper Text Markup Language.

13. The method as claimed in claim 1, wherein the user interface and the service code communicate with each other through an Open Application Programming Interface specification.

14. A host, electrically connected to at least one device, comprising:
a memory, configured to store a service module; wherein the service module comprises a user interface and a service code; and
a processor, electrically connected to the memory, configured to execute the following steps:
searching for service data associated with the service module; wherein the service data comprises a first port number for accessing the user interface and the service code;
searching whether the service code is available based on the service data;

accessing the service code and the user interface by using the first port number if the service code is available;

executing the service code to access the service module if the service code is accessed, and obtaining a status of the at least one device through the service module;

displaying the status of the at least one device on the user interface;

searching whether a service name associated with the service module is available if the service code is available;

obtaining a port number if the service name associated with the service module is available; and accessing the service code by using the port number.

15. The host as claimed in claim 14, wherein the processor executes a main program to display a main user interface before the processor searches the service data; the processor embeds the user interface of the service module within the main user interface.

16. The host as claimed in claim 14, wherein the processor updates the port number if the service code is accessed; and the processor accesses the service code and the user interface by using a second port number if the service name associated with the service module is not available and the service code cannot be accessed.

17. The host as claimed in claim 14, wherein the processor detects whether at least one device is available after the processor obtains the status of the at least one device through the service module.

18. The host as claimed in claim 14, wherein the user interface is a web page.

\* \* \* \* \*